United States Patent

[11] 3,622,808

[72] Inventor Kozo Uchida
Tokyo, Japan
[21] Appl. No. 858,042
[22] Filed Sept. 15, 1969
[45] Patented Nov. 23, 1971
[73] Assignee Iwatsu Electric Company Limited
Tokyo, Japan
[32] Priorities Sept. 20, 1968
[33] Japan
[31] 43/67643;
June 14, 1969, Japan, No. 44/47080

[54] PULSE SHAPING CIRCUIT
9 Claims, 7 Drawing Figs.

[52] U.S. Cl. .......... 307/268, 307/319
[51] Int. Cl. .......... H03k 17/00
[50] Field of Search .......... 307/268, 319, 320, 280, 281

[56] References Cited

UNITED STATES PATENTS

| | | | |
|---|---|---|---|
| 3,168,654 | 2/1965 | Lewis | 307/319 |
| 3,184,605 | 5/1965 | Herzog | 307/320 X |
| 3,479,535 | 11/1969 | Hwang | 307/319 |
| 3,500,265 | 3/1970 | Klettke | 307/320 X |
| 3,519,943 | 7/1970 | Gassmann | 307/319 X |

*Primary Examiner*—Donald D. Forrer
*Assistant Examiner*—B. P. Davis
*Attorney*—Chittick, Pfund, Birch, Samuels & Gauthier

ABSTRACT: A pulse shaping circuit for producing high-frequency pulses of extremely steep waveform is comprised by a first snap-off diode connected between input and output terminals, a second snap-off diode connected to the juncture between the first snap-off diode and the output terminal and an impedance connected between the ground and the juncture between the input terminal and the first snap-off diode, the first and second snap-off diodes being poled oppositely with respect to the output terminal. The width of the shaped pulses is determined by the setting of the impedance. Sources of DC supply of suitable polarities may be connected to said impedance and said second snap-off diode.

KOZO UCHIDA *INVENTOR*

BY Chittick, Pfund, Birch, Samuels & Gauthier
ATTORNEY

KOZO UCHIDA INVENTOR

BY Chittick, Pfund, Birch, Samuels & Gauthier
ATTORNEY

PULSE SHAPING CIRCUIT

CROSS-REFERENCE TO RELATED APPLICATION

This application is related to the application of Kozo Uchida entitled WORD PULSE GENERATING DEVICES, Ser. No. 858,075 filed Sept. 15, 1969 concurrently herewith.

BACKGROUND OF THE INVENTION

This invention relates to a new and improved pulse shaping circuit for generating pulses having steep build up and cut off characteristics from a sine wave or a signal having similar waveform.

As the circuits for generating pulses of high recurrent frequencies, it has been proposed in the past a number of circuits comprising transistors alone or a combination of high speed diodes such as tunnel diodes and transistors. However, it has been difficult not only to generate pulses having sufficiently high recurrent frequencies but also to sufficiently decrease the build up as well as cut off times of the pulse owing to large charge storage time of the transistor. Thus, it has been difficult to provide high speed pulses.

SUMMARY OF THE INVENTION

It is an object of this invention to provide a novel pulse shaping circuit capable of providing pulses having extremely short build up and cut off times.

Another object of this invention is to provide a novel pulse shaping circuit capable of operating at extremely high frequencies.

Still another object of this invention is to provide an improved pulse shaping circuit wherein the width of the shaped pulses can be readily varied to any desired width by simple means.

This invention contemplates to utilize a snap-off diode (also known as the step recovery diode or charge storage diode) and to apply a signal of sine wave or of similar waveform to the diode as the input so as to generate pulses having the same frequency as the input signal and extremely short build up and cut off times.

According to the basic embodiment of this invention the pulse shaping circuit comprises a first snap-off diode connected between an input terminal adapted to receive an input signal to be shaped and an output terminal for the shaped pulse, an impedance connected between the ground and a first juncture between one terminal of the snap-off diode and the input terminal, a second snap-off diode connected between the ground and a second juncture between the other terminal of the first snap-off diode and the output terminal and means to ground the second juncture, said means exhibiting a relatively low impedance for direct current but a relatively high impedance for high frequency current, said first and second snap-off diodes being poled oppositely with respect to the output terminal.

According to a modified embodiment of this invention a DC source is connected to the grounded terminal of said impedance, another DC source is connected to the second snap-off diode through a DC impedance on the side of the second snap-off diode opposite said second juncture and the juncture between the second snap-off diode and the last mentioned DC impedance is grounded through a capacitor.

BRIEF DESCRIPTION OF THE DRAWING

Further objects and advantages of the invention together with the organization and operation thereof can be more fully understood from the following detailed description when taken in conjunction with the accompanying drawing in which.

DESCRIPTION OF THE PREFERRED EMBODIMENTS

The pulse shaping circuit shown in FIG. 1 comprises a snap-off diode $D_1$ (for brevity hereinafter called as diode) with its cathode electrode connected to an input terminal I and an anode electrode to an output terminal O. The juncture $P_1$ between input terminal I and diode $D_1$ is connected to a source of supply B through a series circuit including an inductance $L_1$ and a variable resistor $R_1$. Whereas the juncture $P_2$ between diode $D_1$ and output terminal O is grounded through a series circuit including a second diode $D_2$ and a condenser $C_1$. The juncture $P_3$ between the anode electrode of diode $D_2$ and condenser $C_1$ is connected to a source of supply C via a variable resistor $R_2$. Furthermore said juncture $P_2$ is grounded through an inductance $L_2$.

The operation of the pulse shaping circuit shown in FIG. 1 will now be described with reference to curve shown in FIG. 2. First, it is assumed that the signal arriving at the input terminal I is a sine wave as shown in FIG. 2*a*. For the sake of description, in the circuit shown in FIG. 1, two cases are assumed, one wherein diode $D_2$ is eliminated, the other wherein diode $D_1$ is short circuited.

1. The case wherein diode $D_2$ is eliminated.

Figures 2A, 2B, 2C, 2D:
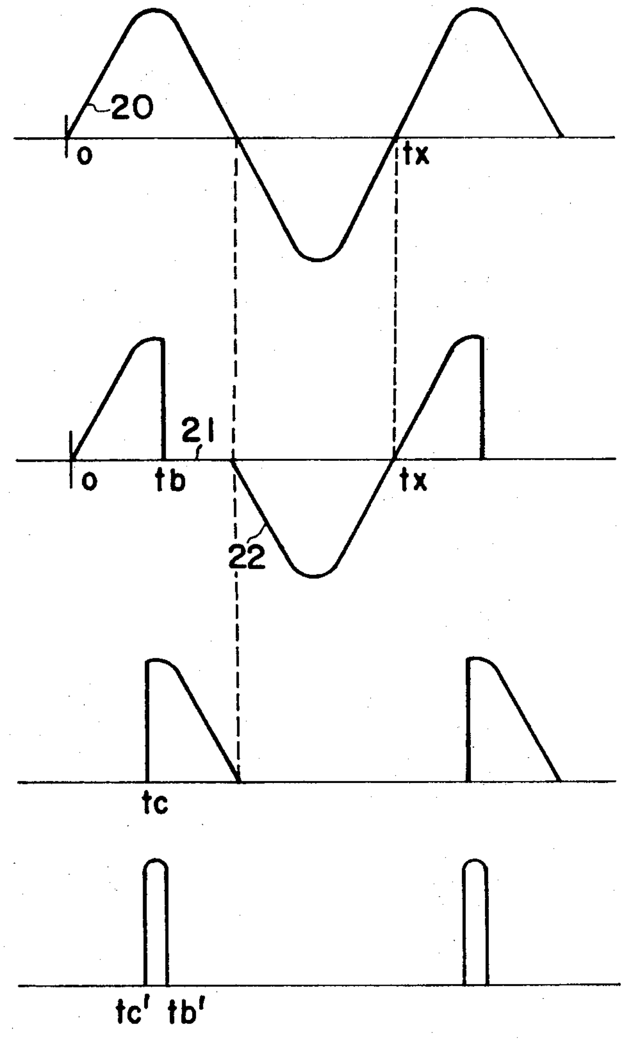
FIGS. 2*a* through 2*d* show waveforms to explain the operation of the circuit shown in FIG. 1.

When a signal having a sine waveform as shown in FIG. 2*a* arrives at the input terminal I the waveform appearing at the anode electrode of diode $D_1$ will be shown by FIG. 2*b*. More particularly, after a time $t_b$ the positive half cycle 20 of the incoming signal wave is eliminated or interrupted. This is because that while diode $D_1$ is passing current in the forward direction, even when the direction of the current flowing through the diode $D_1$ is reversed by the arrival of the input signal, the diode maintains its conductive state for a while, or during the charge storage time thereof and when this charge storage time has elapsed diode $D_1$ becomes abruptly nonconductive at the time $t_b$, thus decreasing the output substantially to zero as shown by 21. As soon as the voltage is impressed across diode $D_1$ in the forward direction (the negative half cycle of the input wave), the diode becomes conductive to provide the output wave 22. For the reason as above described even after the polarity of the input wave has changed form the forward to the reverse direction with respect to diode $D_1$, it will not become nonconductive immediately but becomes off only after elapse of the charge storage time, as shown in FIG. 2*b*. The point at which forward current and forward voltage of the diode $D_1$ change to reverse voltage can be varied by varying the value of adjustable resistor $R_1$. This also results in the variation of the charge storage time whereby it is possible to set to any desired instant the time $t_b$ at which diode $D_1$ becomes off. Where the polarity of the source B is negative, upon decrease of the value of the variable resistor $R_1$, the time $t_b$ becomes longer, or shifts to the right and vice versa. On the other hand, where the polarity of the source B is positive, decrease in the value of the variable resistor $R_1$ causes the time $t_b$ to shift to the left, thus causing the diode to become nonconductive at an earlier time. The same is true where the voltage of the source B is zero. It is to be understood that inductances $L_1$ and $L_2$ are designed to manifest large reactances for the input signal.

2. Where the diode $D_1$ is short circuited.

Again, upon arrival of the input wave as shown in FIG. 2*a* at the input terminal I, the waveform shown in FIG. 2*b* appears at the cathode electrode of the diode $D_2$. This is because while the diode is conducting current in the forward direction under forward voltage impressed across it, even when the voltage is changed to the reverse voltage the diode does not immediately become off but only after elapse of the charge storage time. By the repetition of this phenomenon a waveform as shown in FIG. 2*c* can be obtained. Condenser $C_1$ is used for the purpose of grounding the anode electrode of diode $D_2$ at higher frequencies. Where the polarity of the source C is positive decrease in the value of variable resistor $R_2$ results in the shifting of the off time $t_c$ of diode $D_2$ to the right whereas increase in the value of variable resistor $R_2$ results in the shifting of the off time $t_c$ to the left. On the other hand, where the polarity of the source C is negative the off time $t_c$ shifts further to the left. The same is true even when the voltage of the source C is zero.

Figure 1:
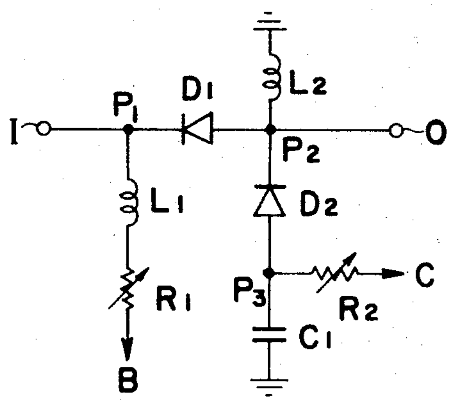
FIG. 1 is a connection diagram of one embodiment of the novel pulse shaping circuit.

In the foregoing description while both cases 1 and 2 have been considered separately it will be clear that the operation of the circuit shown in FIG. 1 is determined by the combination of the operations of both cases 1 and 2. More particularly, when the input waveform shown in FIG. 2a arrives at the input terminal I, an output wave in the form of a pulse train having extremely steep build up and cut off characteristics as shown in FIG. 2d will appear at the output terminal 0. As can be clearly noted from FIG. 2, the width of the shaped pulse is determined by instants $t'_b$ and $t'_c$, respectively, which are determined by said times $t_b$ and $t_c$ in cases 1 and 2 respectively. The elements that determine the pulse width include diodes $D_1$ and $D_2$, variable resistors $R_1$ and $R_2$ and the polarities of sources B and C. As a consequence, according to this invention, when the variable resistors $R_1$ and $R_2$, for example, are adjusted so as to establish a relation $t'_c > t'_b$ it is possible to eliminate the pulse ever in the presence of an input signal. Inductance $L_2$ shown in FIG. 1 functions to manifest any appreciable resistance for the direct current flowing through diodes $D_1$ and $D_2$ but manifests a sufficiently high impedance against high frequencies, thus grounding the juncture $P_2$ for direct current.

Figure 3:
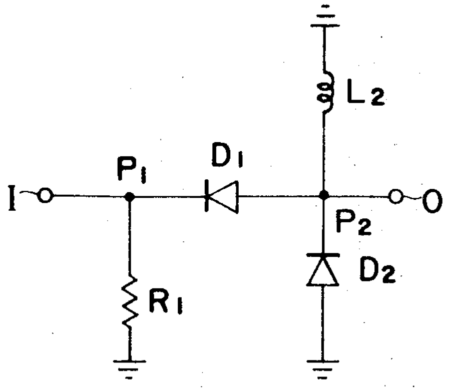
FIG. 3 shows a modified embodiment of this invention.

FIG. 3 illustrates a modified embodiment of this invention which corresponds to a modification of FIG. 1 wherein the voltages of sources B and C are reduced to zero. It is advantageous to select the value of resistor $R_1$ at a value that causes the resistor to act as the terminal resistance for the input signal.

Figure 4:
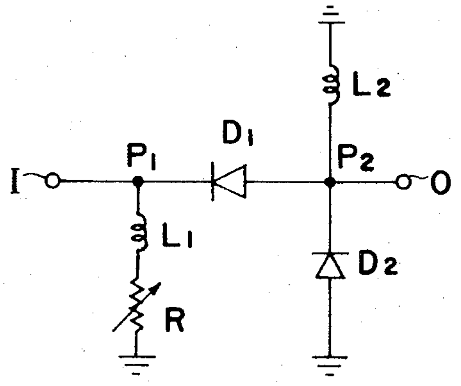
FIG. 4 shows a still further modification of this invention.

In another embodiment shown in FIG. 4 a variable inductance $L_1$ is included in series with the variable resistor $R_1$.

Although in the illustrated embodiments the input signal was assumed to have a sine waveform it is to be understood that the invention is not limited to this particular waveform but the input may have pulsed waveform. Furthermore in the embodiments positive pulses were shaped, negative pulses can also be shaped by mere reversal of the polarities of diodes $D_1$ and $D_2$.

Thus, this invention provides an improved pulse shaping circuit capable of producing pulses having very steep build up and cut off characteristics from an input signal which varies gradually, such as a sine wave or the like. Moreover, since the pulses are formed by shaping the input signal, the higher is the frequency of the input signal, the higher is the frequency of the output pulse. The amplitude of the output pulse can be set to a value corresponding to the breakdown voltage of the diodes employed, and the width of the amplitude pulse can be advantageously varied to any desired value by adjusting the variable resistors. Thus, the novel pulse shaping circuit is especially suitable for producing pulses of extremely narrow width.

While the invention has been shown and described in terms of preferred embodiments thereof it should be understood that many changes and modifications may be made without departing from the spirit and scope of the invention.

What is claimed is:

1. A pulse shaping circuit comprising a first snap-off diode connected between an input terminal adapted to receive an input signal to be shaped and an output terminal for the shaped pulse, an impedance element connected between the ground and a first juncture between one terminal of said snap-off diode and said input terminal, a second snap-off diode c connected between a second juncture between the other terminal of said first snap-off diode and said output terminal, and the ground, and means to ground said second juncture, said means exhibiting a relatively low impedance for direct current but a relatively high impedance for high frequency currents, said first and second snap-off diodes being poled oppositely with respect to said output terminal.

2. A pulse shaping circuit comprising a first snap-off supply connected between an input terminal adapted to receive an input signal to be shaped and an output terminal for the shaped pulse, a first source of DC supply connected to a first juncture between said input terminal and one terminal of said first snap-off diode through a first direct current impedance means, a second snap-off diode with one terminal connected to a second juncture between the other terminal of said first snap-off diode and said output terminal, the other terminal of said second snap-off diode grounded through a second impedance means manifesting relatively low impedance for high frequency currents, and a second source of DC supply connected to a third juncture between said second snap-off diode and said second impedance means via a second Direct current impedance means, said first and second snap-off diodes being poled oppositely with respect to said output terminal.

3. The pulse shaping circuit according to claim 1 wherein said impedance element is an adjustable impedance means for varying the width of said shaped pulse of the shaped pulse is varied by adjusting said impedance.

4. The pulse shaping circuit according to claim 1 wherein said impedance element is a fixed resistance.

5. The pulse shaping circuit according to claim 2 wherein the width of the shaped pulse is varied by adjusting said first DC impedance.

6. The pulse shaping circuit according to claim 2 wherein the width of the shaped pulse is varied by adjusting said second DC impedance.

7. The pulse shaping circuit according to claim 2 wherein the width of the shaped pulse is varied by adjusting said first and second DC impedance.

8. The pulse shaping circuit according to claim 1 wherein said input signal is a high frequency signal having a sine waveform or similar waveform.

9. The pulse shaping circuit according to claim 2 wherein said input signal is a high frequency signal having a sine waveform or a similar waveform.

* * * * *

PO-1050
(5/69)

UNITED STATES PATENT OFFICE
CERTIFICATE OF CORRECTION

Patent No. 3,622,808 Dated November 23, 1971

Inventor(s) Kozo Uchida

It is certified that error appears in the above-identified patent and that said Letters Patent are hereby corrected as shown below:

Column 2, line 41, the word "form" should be -- from --;

Claim 2, column 4, line 17, the word "supply" should be -- diode --;

Claim 2, column 4, line 26, the word -- being -- should be inserted before the word "grounded";

Claim 3, column 4, lines 35, 36, everything after the word "pulse", first occurrence, on line 35, should be deleted and a period --(.)-- inserted after the word "pulse";

Claim 7, column 4, line 47, the word "impedance" should be -- impedances --.

Signed and sealed this 27th day of June 1972.

(SEAL)
Attest:

EDWARD M.FLETCHER, JR.
Attesting Officer

ROBERT GOTTSCHALK
Commissioner of Patents